3,294,823
METHOD OF PREPARING STEROIDAL
6-CHLORO-4,6-DIENES
Yvon L. Lefebvre, Pierrefonds, Quebec, Canada, assignor to American Home Products Corporation, New York, N.Y., a corporation of Delaware
No Drawing. Filed Nov. 10, 1964, Ser. No. 410,292
5 Claims. (Cl. 260—397.3)

This application is a continuation-in-part of my copending application, Serial No. 299,158, filed August 1, 1963.

The present invention relates to steroidal 6-chloro-4,6-dienes of the pregnane, androstane, and cholestane series, which are characterized by possessing the following structure in rings A and B

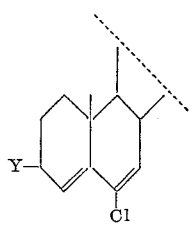

in which Y represents an acyloxy, an hydroxyl, or a keto group, and to methods for their preparation. More specifically, the present invention relates to 6-chloropregna-4,6-dien-20-ones, and to methods for the preparation of compounds of the general Formulae II and III:

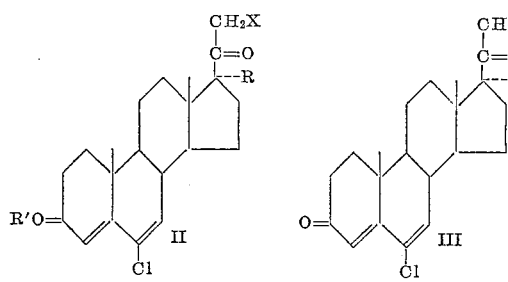

in which R represents hydrogen, acyloxy, or a straight chain lower alkyl group containing from 1–4 carbon atoms, R' represents hydrogen or an acyl group, and X represents hydrogen or fluorine.

The new compounds produced in accordance with my invention are useful compounds, in that they are useful in steroid research generally and as intermediates in the preparation of other steroid compounds which are characterized by biological activities. For example, the compounds of this invention in the pregnane series are useful as progestational agents of unusually high potency, and long duration of action, active both by injection and by oral administration. The compounds of this invention in the pregnane series are further distinguished by being useful for maintaining pregnancy. Said compounds have also been found to be substantially free from objectionable side-effects such as masculinization and suppression of adrenal function, and other compounds of this invention in the pregnane series have been found to possess valuable anti-androgenic activity. Of the other compounds of this invention, 6-chloro-3β,17β-diacetoxy-androsta-4,6-diene has valuable androgenic, anabolic, and gonadotrophin-suppressing properties, and 6-chloro-3β-hydroxy-cholesta-4,6-diene is useful as a cholesterol-lowering agent.

The compounds of this invention may be administered in dosage forms such as tablets, capsules, or the like, such dosage forms to contain from 1 to 50 mg. of the active compound per dosage form, the active agent being present in such dosage forms together with excipients such as, lactose, starch, magnesium stearate, and the like, as well as such other substances as are commonly used in the formulation of dosage forms for oral administration. For the purposes of administering the compounds of this invention by injection they may be suspended in a fine state of division in a pharmaceutically acceptable aqueous vehicle, or they may be administered in solution in a pharmaceutically acceptable solvent.

The compounds of this invention corresponding to Formula II in which R', R, and X are as defined above, are also useful as intermediates in the preparation of the compounds of Formula III, in which R and X are as defined above.

The starting materials for the preparation of the compounds of this invention are 3β-acyloxy-Δ⁴-6-ketosteroids of the pregnane, androstane, and cholestane series possessing the following structure in rings A and B

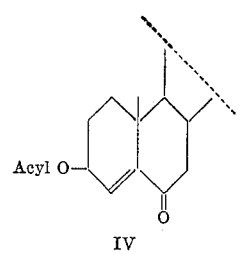

More specifically those starting materials are new 4-pregnene-6,20-diones which may be represented by the general Formula V

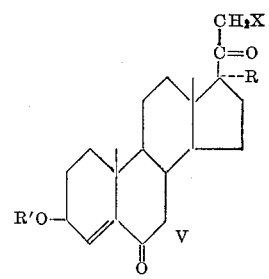

in which R represents hydrogen, a straight chain lower alkyl group containing from 1–4 carbon atoms, or an acyloxy group, X represents hydrogen or fluorine, and R' represents an acyl group.

Those compounds in which R' represents the acetyl group may be prepared as described in the co-pending U.S. patent application Serial No. 285,210, filed June 4, 1963, in the names of Y. Lefebvre and P. F. Morand and now abandoned. Hydrolysis with bicarbonate yields the corresponding 3β-hydroxy derivatives, which are esterified with the appropriate acid halides or anhydrides in the presence of pyridine to yield the corresponding 3β-acyl-oxypregn-4-ene-6,20-diones.

The 17α-acylated 3β-acetoxypregn-4-ene-6,20-diones are prepared from the corresponding 17α-acyloxy pregnenolone acetate by the methods described in the co-pending U.S. patent application Serial No. 285,210. In this manner there are obtained 3β-acetoxy-17α-propionyl-oxypregn-4-ene-6,20 - dione, 3β-acetoxy-17α-butyryloxy-pregn-4-ene-6,20-dione, 3β-acetoxy-17α-valeryloxypregn-4-ene-6,20-dione, and 3β-acetoxy-17α-hexanoyloxypregn-4-ene-6,20-dione.

The latter 17α-acylated 3β-acetoxypregn-4-ene-6,20-diones are selectively hydrolyzed with bicarbonate as above, and the corresponding 3β-hydroxy derivatives are acylated with the appropriate acid halide or anhydride to yield the corresponding 3β, 17α-diacyloxypregn-4-ene-6,20-diones.

With regard to the process aspects of this invention which are novel, my invention is concerned with the treatment of a steroid compound having a double bond between carbon atoms 4 and 5 and a keto (oxo) group in the 6-position, whereby an additional double bond is introduced between carbon atoms 6 and 7 and the oxygen in position 6 is replaced by chlorine. As will be explained more fully hereafter, in carrying out this process I utilize phosphorus pentachloride as the reagent for treating said steroid.

I have now found that treatment of a 3β-acyloxy-Δ⁴-6-ketosteroid of Formula IV, or of a 4-pregnene-6,20-dione of a structure corresponding to Formula V with phosphorus pentachloride in an inert solvent yields a compound of the structure represented by Formula I in which Y represents an acyloxy group, or, respectively, of Formula II in which R' represents an acyl group and R and X have the significance defined above. The inert solvent must not contain groupings which will react with phosphorus pentachloride and it must not be basic nor a Lewis base. Preferred solvents are aromatic hydrocarbons, with a boiling point below 150° C., for example, benzene, toluene, or xylene; lower aliphatic esters, for example, methyl or ethyl acetate; and certain halogenated aliphatic hydrocarbons such as, for example, carbon tetrachloride. The course of this reaction is entirely unexpected in that the 20-keto group of the starting material is not affected, contrary to the well-known reaction of phosphorus pentachloride with aliphatic ketones. Temperature of the reaction is not critical, although extreme temperature will decrease the yield of desired end product. Operable temperatures include temperatures between 20° C and the temperature of the boiling reaction mixture, with a temperature range of between 20° and 30° C. being preferred. Similarly, the molar ratio of phosphorus pentachloride to 6-keto steroid is not critical but affects the speed of reaction. For example, this molar ratio may be varied from 1:1 to 5:1 with ensuing speeding up of the reaction; with a 1:1 molar ratio of reactants the reaction is essentially complete in from one to two hours; with a 2:1 molar ratio, in approximately one-half hour; and with a 5:1 molar ratio, in approximately five minutes.

I have found, in a preferred embodiment of this invention, that it is advantageous to add a base which is soluble in the reaction mixture such as, for example, pyridine, or a Lewis base which is also soluble in the reaction mixture such as, for example, dioxane, to the reaction mixture a short time after the spontaneous start of the reaction in amounts inferior to those necessary to stop the reaction. In one particular embodiment of my invention addition of one molar equivalent of such a base or Lewis base has been found to improve yields by a factor of at least three.

After completion of the reaction the desired end product is recovered from the reaction mixture by conventional means. In a preferred reaction procedure an organic base soluble in the solvent employed, such as, for example, pyridine, is added at the end of the reaction in amounts sufficient to stop the reaction. Amounts of two to three moles per mole of PCl₅ have been found sufficient for this purpose. The precipitate thus obtained may be removed by filtration. The filtrate contains the desired steroidal 6-chloro-4,6-diene of Formula I in which Y represents an acyloxy group, or, respectively, the 6-chloropregna-4,6-dien-20-one of Formula II in which R' represents an acyl grouping, and R and X are as defined above. The latter compound is isolated by evaporation of the solvent and purified by conventional procedures such as, for example, chromatography and or crystallization.

The 3-acylates of the steroidal 6-chloro-4,6-dienes or 6-chloropregna-4,6-dien-20-ones obtained above are hydrolyzed in a basic medium to yield the corresponding steroidal 6-chloro-4,6-dienes of Formula I in which Y represents an hydroxyl group, or, respectively, the 6-chloro-3β-hydroxy-pregna-4,6-dien-20-ones of Formula II in which R' represents hydrogen and R and X have the significance defined above. The latter compounds are oxidized by conventional means such as, for example, the Oppenauer method or by hexavalent chromium ion, to the corresponding steroidal 6-chloro-4,6-dienes of Formula I in which Y represents a keto group, or, respectively, the 6-chloro-6-dehydroprogesterones of Formula III in which R and X have the significance defined above. The latter compounds may again be reduced to the corresponding 3β-alcohols of Formula I or II in which Y represents an hydroxyl group, or in which R' represents hydrogen, respectively, by reaction with a reducing agent, such as, for example, sodium borohydride or lithium tri-(tertiary butoxy) aluminum hydride.

More specifically, 3β-acetoxypregn-4-ene-6,20-dione (V, R'=CH₃CO, R=X=H) yields 3β-acetoxy-6-chloropregna-4,6-dien-20-one (II, R'=CH₃CO, R=X=H), which may be hydrolyzed to the corresponding alcohol, 6-chloro-3β-hydroxy-pregna-4,6-dien-20-one (II, R'=R=X=H)

which may in turn be oxidized to the corresponding 3-ketone, 6-chloro-6-dehydroprogesterone (III, R'=X=H). The 3β-acyloxypregn-4-ene-6,20-diones yield the corresponding 3β-acyloxy-6-chloropregna-4,6-diene-20-ones which upon hydrolysis and subsequent oxidation, yield the same compounds as above.

In the same manner, the 3β-acyloxy-17α-(lower alkyl)-pregn-4-ene-6,20-diones (V) yield the corresponding 3β-acyloxy-6-chloro-17α-(lower alkyl)pregna-4,6-dien-20-ones (II). The latter compounds are hydrolyzed to the corresponding 6-chloro-3β-hydroxy-17α-(lower alkyl)-pregna-4,6-dien-20-ones (II, R'=H), which are in turn oxidized to the corresponding 6-chloro-6-dehydro-17α-(lower alkyl) progesterones (III).

More specifically, 3β-acetoxy-17α-methylpregn-4-ene-6,20-dione (V, R'=CH₃CO, R=CH₃, X=H) yields 3β-acetoxy-6-chloro-17α-methylpregna-4,6-dien-20-one

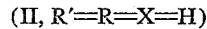
(II, R'=CH₃CO, R=CH₃, X=H)

The latter compound is hydrolyzed to the corresponding alcohol, 6-chloro-3β-hydroxy-17α-methylpregna-4,6-dien-20-one (II, R=CH₃, R'=X=H), which is oxidized to the corresponding 6-chloro-6-dehydro-17α-methylprogesterone (III, R=CH₃, X=H). In a similar manner other corresponding 17α-lower alkyl compounds, such as the 3β-acetoxy-6-chloro-17α-ethylpregna-4,6-dien-20-one, 3β - acetoxy-6-chloro-17α-n-propyl-pregna-4,6-dien-20 - one, 3β - acetoxy - 17α-n-butyl-6-chloropregna-4,6-dien-20-one, and their corresponding products of hydrolysis and oxidation may be obtained.

In a similar manner, the 3β-acyloxy-21-fluoro-17α-(lower alkyl)pregn-4-ene-6,20-diones (V) yield the 3β-acyloxy-6-chloro-21-fluoro-17α-(lower alkyl)pregna-4,6-dien-20-ones (II). The latter compounds are hydrolyzed to the corresponding 6-chloro-21-fluoro-3β-hydroxy-17α-(lower alkyl)pregna-4,6-dien-20-ones (II, R'=H), which are in turn oxidized to the corresponding 6-chloro-6-dehydro-21-fluoro-17α(lower alkyl)progesterones (III).

More specifically, 3β-acetoxy-21-fluoro-17α-methylpregn-4-ene-6,20-dione (V, R'=CH₃CO, R=CH₃, X=F), yields 3β-acetoxy-6-chloro-21-fluoro-17α - methylpregna-4,6-dien-20-one

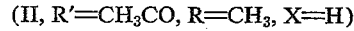
(II, R'=CH₃CO, R=CH₃, X=F)

The latter compound may be hydrolyzed to the corresponding alcohol, 6-chloro-21-fluoro - 3β - hydroxy - 17α-methylpregna-4,6-dien-20-one

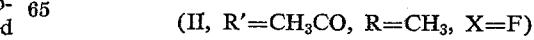
(II, R'=H, R=CH₃, X=F)

which may be oxidized to 6-chloro-6-dehydro-21-fluoro-17α-methylprogesterone (III, X=F, R=CH₃). The same sequence of reactions may also be carried out with the other corresponding 17α-lower alkyl-21-fluoro

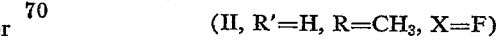

compounds such as the 17α-ethyl, 17α-n-propyl and 17α-n-butyl compounds to yield the corresponding 3β-acetoxy-6-chloro-21-fluoro-17α-(lower alkyl)-pregna-4,6-dien-20-ones, and their corresponding products of hydrolysis and oxidation; in the same manner, the corresponding 3β-acyloxy-21-fluoropregn-4-ene-6,20-diones yield 3β-acyloxy-6-chloro-21-fluoro-pregna-4,6-dien-20-ones and their products of hydrolysis and oxidation.

In a similar manner, 3β, 17α-diacyloxypregn-4-ene-6,20-diones (V) yield 6-chloro-3β, 17α-diacyloxy-pregna-4,6-dien-20-ones (II), which are hydrolyzed to the corresponding 17α-acyloxy-6-chloro-3β-hydroxy-pregna-4,6-dien-20-ones (II, R′=H), which are in turn oxidized to the corresponding 17α-acyloxy-6-chloro-6-dehydro progesterones (III). The latter compounds are in turn reduced to their precursors (II). Similarly, the corresponding compounds of Formula II in which the 21-position is substituted by fluorine, and their products of hydrolysis and oxidation, are prepared.

More specifically, 3β,17α - diacetoxypregn - 4 - ene-6,20 - dione (V, R=CH₃CO, R′=CH₃COO, X=H) yields 6 - chloro - 3β-17α - diacetoxy - pregna - 4,6-dien-20-one (II, R′=CH₃CO, R=CH₃COO, X=H). The latter compound is hydrolyzed to 17α-acetoxy-6-chloro-3β-hydroxy-pregna-4,6-dien-20-one

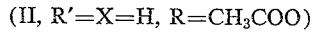

which is oxidized to 17α-acetoxy-6-chloro-6-dehydro-progesterone (III, R=CH₃COO, X=H). The latter compound is reduced to its precursor

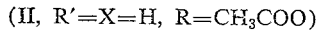

Similarly, 17α-acetoxy-3β-hexanoyloxypregn-4-ene-6,20-dione and 17α-acetoxy-3β-[3′-(cyclopentyl)] propionyloxypregn-4-ene-6,20-dione (both prepared from the corresponding 3β,17α-diacetoxy derivative by hydrolysis and re-esterification with the appropriate acylating agent) yield 17α-acetoxy-6-chloro-3β-hexanoyloxy-pregna-4,6-dien-20-one, and 17α-acetoxy-6-chloro-3β-[3′-(cyclopentyl)] propionyloxypregna-4,6-dien-20-one, respectively. Their respective products of hydrolysis and oxidation are obtained as above.

In the same manner the corresponding compounds in which the 17α-hydroxy group is esterified with lower aliphatic acids such as, for example, the 17α-hydroxy hexanoate, are prepared. Examples of compounds which are obtained in the above manner include 6-chloro,3β,17α-diacetoxy-21-fluoropregna-4,6-dien-20-one and its products of hydrolysis and oxidation, 3β-acetoxy-6-chloro-21-fluoro-17α-hexanoyloxypregna-4,6-dien-20-one and its products of hydrolysis and oxidation, and 3β-acetoxy-6-chloro-17α-hexanoyloxypregna-4,6-dien-20-one and its products of hydrolysis and oxidation.

In a similar manner, the 3β,17β-diacyloxyandrost-4-ene-6-ones yield the corresponding 6-chloro-3β,17β-diacyloxyandrosta-4,6-dienes when treated with phosphorus pentachloride. These latter compounds, upon hydrolysis, yield 6-chloro-3β,17β-dihydroxyandrosta-4,6-diene, which in turn, upon oxidation, yields 6-chloroandrosta-4,6-diene-3,17-dione.

In the same manner, the 3β-acyloxycholest-4-ene-6-ones yield the 3β-acyloxy-6-chlorocholesta-4,6-dienes from which 6-chloro-3β-hydroxycholesta-4,6-diene is obtained by mild alkaline hydrolysis; oxidation yields 6-chloro-cholesta-4,6-dien-3-one.

More specifically, 3β,17β-diacetoxyandrost-4-ene-6-one, prepared from the known 3β,17β-diacetoxy-5α-hydroxyandrostan-6-one by treatment with thionyl chloride, yields 6-chloro-3β,17β-diacetoxyandrost-4,6-diene when treated with phosphorus pentachloride. In the same manner, the known 3β-acetoxycholest-4-ene-6-one yields, upon treatment with phosphorus pentachloride, 3β-acetoxy-6-chlorocholesta-4,6-diene, from which the corresponding 3β-hydroxy compound, 6-chloro-3β-hydroxycholesta-4,6-diene, is obtained by mild alkaline hydrolysis.

The following examples will illustrate my invention:

*Example 1.—3β-acetoxy-6-chloropregna-4,6-dien-20-one*

A mixture of 3β-acetoxypregn-4-ene-6,20-dione (10.8 g.) phosphorus pentachloride (10.8 g.) and benzene (518 cc.) is stirred at room temperature for one minute. Then dioxane (4.4 cc.) and benzene (52 cc.) are added and the stirring is resumed for thirty minutes at room temperature. At the end of this time pyridine (12 cc.) is added. Pyridine hydrochloride is filtered, well washed with ether, and the filtrate is washed with sodium bicarbonate, water, dried, and evaporated, leaving crude 3β-acetoxy-6-chloropregna-4,6-dien-20-one. Purification by chromatography on florisil gives the pure chloroderivative, which shows in the ultra-violet spectrum maxima of absorption, characteristic of the system, at 238 mμ, 243 mμ, and 251 mμ.

In the same manner the 3β-acyloxypregn-4-ene-6-20-diones yield the corresponding 3β-acyloxy-6-chloropregna-4,6-diene-20-ones.

Hydrolysis of the above acylated compounds in a manner similar to that described in Example 3 of this application yields the corresponding alcohol, 6-chloro-3β-hydroxypregna-4,6-dien-20-one, which is oxidized to 6-chloro-6-dehydroprogesterone.

*Example 2.—3β-acetoxy-6-chloro-17α-methylpregna-4,6-dien-20-one*

A mixture of 2.375 g. of 3β-acetoxy-17α-methylpregn-4-ene-6,20-dione, 2.375 g. of phosphorus pentachloride in 110 cc. of dry benzene, is stirred for 30 minutes at room temperature. The solution is poured in ice-water and the benzene solution is washed with sodium bicarbonate and water, is dried, and evaporated to dryness. Chromatography and crystallization from methanol gives the pure 3β - acetoxy - 6 - chloro - 17α - methylpregna - 4,6 - dien-20-one, M.P. 139–141° C.. [α]ᴅ=—67.6°.

Calculated for C₂₄H₃₃O₃Cl: C%, 71.18; H%, 8.21; Cl%, 8.75. Found: C%, 70.94; H%, 8.28; Cl%, 8.70.

Alternatively, a mixture of 1 g. of 3β-acetoxy-17α-methylpregn-4-ene-6,20-dione, and 1 g. of phosphorus pentachloride in 50 cc. of dry benzene is stirred at room temperature for one minute. A solution of 0.4 cc. of dry dioxane in 5 cc. benzene is then added and the reaction is allowed to proceed for thirty minutes.

The reaction mixture is poured in an ice-cold sodium bicarbonate solution. The organic layer is decanted, washed free of base, dried and evaporated. The residue is a yellow resin, which upon chromatography on florisil and crystallization from methanol yields 3β-acetoxy-6-chloro-17α-methylpregna-4,6-dien-20-one, M.P. 136–141° C.

Similarly, a mixture of 1 g. of 3β-acetoxy-17α-methylpregn-4-ene-6,20-dione, 1 g. of phosphorus pentachloride and 50 cc. of benzene is stirred for a minute. Then at regular intervals (three minutes) are introduced small portions of a solution of 0.35 cc. of pyridine in 5 cc. of benzene. After thirty minutes the remainder of the pyridine solution is added.

The reaction is worked up as described above to yield 3β-acetoxy - 6 - chloro-17α-methylpregna-4,6-dien-20-one, M.P. 136–139° C.

Similarly, a mixture of 200 mg. of 3β-acetoxy-17α-methylpregn-4-ene-6,20-dione, 200 mg. of phosphorus pentachloride, and 10 cc. of carbon tetrachloride is stirred at room temperature for 30 minutes, and 0.1 cc. of pyridine is added at the end of the reaction. Working up as described above and crystallization from methanol yields 3β-acetoxy-6-chloro-17α-methylpregna-4,6-dien-20-one, M.P. 138–143° C.

In the same manner, a mixture of 200 mg. of 3β-acetoxy-17α-methylpregn-4-ene-6,20-dione, 200 mg. of phosphorus pentachloride and 10 cc. ethyl acetate is stirred at room temperature for 30 minutes, and 0.1 cc. of pyridine is added at the end of the reaction. Working up as described above yields 3β-acetoxy-6-chloro-17α-methylpregna-4,6-dien-20-one identified with an authentic sample by thin-layer chromatography.

In the same manner, the 3β-acyloxy-17α-(lower alkyl)pregn-4-ene-6,20-diones (V) yield the corresponding 3β-acyloxy-6-chloro-17α-(lower alkyl)pregna-4,6 - dien - 20-ones.

*Example 3.—6-chloro-3β-hydroxy-17α-methylpregna-4,6-dien-20-one*

A solution of 3β-acetoxy-6-chloro-17α-methylpregna-4,6-dien-20-one (5.3 g.), potassium bicarbonate (1.37 g), methanol (215 cc.) and water (21.5 cc.) is refluxed under nitrogen for 30 minutes.

To the still hot solution water is added and the resulting solid is filtered and dried M.P. 187.5–188.5° C. Further crystallization from methylene chloride-hexane does not raise the melting point of 6-chloro-3β-hydroxy-17α-methylpregna-4,6-dien-20-one. The ultra-violet spectrum shows maxima of absorption at 237 m$\mu$, 244 m$\mu$ ($\epsilon$=22590), 252 m$\mu$ and 287 m$\mu$ ($\epsilon$=67.4).

In the same manner, the corresponding 3β-acyloxy-6-chloro-17α-(lower alkyl)pregn-4,6-dien-20-ones yield the corresponding 6-chloro - 3β - hydroxy-17α-(lower alkyl)pregna-4,6-dien-20-ones.

*Example 4.—6-chloro-6-dehydro-17α-methylprogesterone*

To a solution of 6-chloro-3β-hydroxy-17α-methylpregna-4,6-dien-20-one (500 mg.) in acetone (60 cc.) at 0° C., is added a solution of 8 N chromic acid (1 cc.). The mixture is immediately poured on ice-water and ether-extracted. The ether is washed free of acid, dried and evaporated, leaving an amorphous residue. Purification by chromatography and crystallization from hexane gives the pure 6-chloro - 6 - dehydro-17α-methylprogesterone, M.P. 122–124° C. The infra-red spectrum is identical with that of authentic 6-chloro-6-dehydro-17α-methylprogesterone.

In the same manner, the 6-chloro-3β-hydroxy-17α-(lower alkyl)pregna-4,6,-dien-20-ones are oxidized to yield the corresponding 6-chloro-6-dehydro-17α-(lower alkyl)progesterones.

*Example 5.—3β-acetoxy-6-chloro-21-fluoro-17α-methylpregna-4,6-dien-20-one*

A mixture of 3β-acetoxy-21-fluoro-17α-methylpregn-4-ene-6,20-dione (4.15 g.), phosphorus pentachloride (4.15 g.) in benzene (200 cc.) is stirred for one minute at room temperature. A solution of dioxane (1.6 cc.) in pyridine (20 cc.) is then added and stirring is continued for thirty minutes. Pyridine (2.8 cc.) is added and the pyridine hydrochloride is filtered. The filtrate is washed with sodium bicarbonate and water, dried and evaporated, leaving a yellow resin. Crystallization from methanol and from methylene chloride-hexane gives pure 3β-acetoxy-6-chloro-21-fluoro - 17α - methylpregna-4,6-dien-20-one, M.P. 172–173° C. λmax. 236 m$\mu$, 243 m$\mu$ ($\epsilon$=25,800), 250 m$\mu$, 290 m$\mu$ ($\epsilon$=77).

Calcd for $C_{24}H_{32}O_3ClF$: C%, 68.14; H%, 7.68; Cl%, 8.39; F%, 4.49. Found: C%, 67.90; H%, 7.71; Cl%, 8.17; F%, 4.44.

Hydrolysis of the above compound in a manner similar to that described in Example 3 of this application yields the corresponding alcohol, 6-chloro-21-fluoro-3β-hydroxy-17α-methylpregna-4,6-dien-20-one.

In the same manner, the 3β-acyloxy-21-fluoro-17α-(lower alkyl)pregn-4-ene-6,20-diones yield the corresponding 3β-acyloxy-6-chloro-21-fluoro-17α-(lower alkyl)pregna-4,6-dien-20-ones, which are hydrolyzed to yield the corresponding 6-chloro-21-fluoro-3β-hydroxy-17α-(lower alkyl)pregna-4,6-dien-20-ones, which are in turn oxidized to the corresponding 6-chloro-6-dehydro-21-fluoro-17α-(lower alkyl)progesterones.

*Example 6.—3β,17α-diacetoxy-6-chloropregna-4,6-dien-20-one*

A mixture of 3β,17α-diacetoxypregn-4-ene-6,20-dione (3 g.) phosphorus pentachloride (3 g.) and benzene (150 cc.) is stirred at room temperature for one minute. Then dry dioxane (1.2 cc.) dissolved in benzene (15 cc.) is added and the reaction is continued for thirty minutes. At the end of this time pyridine (2.2 cc.) is added. The pyridine hydrochloride thus formed is filtered and washed with ether. The filtrate is washed with cold sodium bicarbonate, water, dried and evaporated. The residue is a resin which, crystallized from methanol, and then methylene chloride-hexane, gives pure 3β,17α-diacetoxy-6-chloropregna-4,6-dien-20-one, M.P. 202.5–204° C. (dec.) [α]$_D$=—89.5°, λmax. 236 m$\mu$ ($\epsilon$=22,200), 231 m$\mu$, 283 m$\mu$ ($\epsilon$=105).

Calculated for $C_{25}H_{33}O_5Cl$: C%, 66.87; H%, 7.41; Cl%, 7.91. Found: C%, 66.79; H%, 7.42; Cl%, 8.07, 8.06.

*Example 7.—17α-acetoxy-6-chloro-3β-hydroxypregna-4,6-dien-20-one*

A mixture of 3β,17α-diacetoxy-6-chloropregna-4,6-dien-20-one (50 mg.), potassium bicarbonate (13 mg.), methanol (2 cc.) and water (0.2 cc.) is refluxed for thirty minutes. Addition of water gives a colourless solid M.P. 210–211° C. (dec.). Crystallization from acetone-hexane does not raise the melting point. 17α-acetoxy -6- chloro - 3β - hydroxypregna - 4,6 - dien - 20-one shows in the ultra-violet maxima of absorption of 236 m$\mu$, 243 m$\mu$ ($\epsilon$=23,400), 252 m$\mu$ and 287 m$\mu$ ($\epsilon$=142).

A mixture of 17α-acetoxy-6-chloro-6-dehydroprogesterone (50 mg.), dry tetrahydrofuran (1 cc.), lithium aluminum tri-tertiary butoxy hydride (76.2 mg.), is stirred at room temperature for four hours. The excess of hydride is destroyed by acetone and a saturated solution of ammonium sulfate is added. The mixture is extracted with $CH_2Cl_2$, washed with saturated sodium chloride, dried and evaporated. Crystallization of the residue from acetone-hexane gives 17α-acetoxy-3β- hydroxy-6-chloropregna-4,6-dien-20-one, M.P. 213° C. (dec.) identical with the product obtained above, as shown by infra-red spectroscopy.

*Example 8.—17α-acetoxy-6-chloro-6-dehydroprogesterone*

To a solution of 17α-acetoxy-3β-hydroxy-6-chloropregna-4,6-dien-20-one (50 mg.) in acetone (5 cc.) at 0° C. is added dropwise with stirring a solution of 8 N chromic acid (0.15 cc.) and then the mixture is immediately poured in ice-water and extracted with methylene chloride. The organic solution is washed free of acid, dried and evaporated. The residue is 17α-acetoxy-6-chloro-6-dehydroprogesterone. The infra-red and the ultra-violet spectra are identical with that of an authentic sample of 17α-acetoxy-6-chloro-6-dehydroprogesterone.

Alternatively, a mixture of 17α-acetoxy-6-chloro-3β-hydroxypregna-4,6-dien-20-one (275 mg.) aluminum isopropoxide (300 mg.), acetone (1.2 cc.) and benzene (15 cc.) is stirred for twenty-four hours at room temperature. The benzene solution is diluted with ether and the organic solution is washed with cold dilute sulfuric acid, then water. After drying and evaporation, the residue is a resin. Spectral analyses in the infra-red and ultra-violet indicate that this crude compound contains about 30% of 17α-acetoxy-6-chloro-6-dehydroprogesterone.

*Example 9.—3β,17β-diacetoxyandrost-4-en-6-one*

To a solution of 3β,17β-diacetoxy-5α-hydroxyandrostan-6-one [Leo Knof, Ann. 647, 53 (1961)] (6.6 g.) in dry pyridine (66 cc.) at 0° C., is added dropwise at such a rate as to maintain the temperature at 0° C., a solution of thionyl chloride (6.6 cc.) in dry pyridine (15 cc.).

The solution is stirred for one hour at 0° C.; then it is poured in ice-water and the resulting solid is filtered and washed with water. The solid is dissolved in methylene chloride and the organic solution is washed with dilute sulfuric acid and then with water to neutrality.

After drying and evaporating the solvent a solid M.P. 165–169° C., representing crude 3β,17β-diacetoxyandrost-4-en-6-one is obtained. Crystallization from methanol yields the pure compound M.P. 172–174° C., $$[\alpha]_D = -68.9°$$

The ultra-violet spectrum shows a maxima of absorption at 236 mμ with an extinction coefficient of 6930.

Calcd. for $C_{23}H_{32}O_5$: C%, 71.10; H%, 8.30. Found: C%, 70.89; H%, 8.22.

*Example 10.—6-chloro-3β,17β-diacetoxyandrosta-4,6-diene*

A mixture of 3β,17β-diacetoxyandrost-4-en-6-one (3.93 g.), phosphorus pentachloride (3.93 g.) and carbon tetrachloride (294 cc.) is stirred at room temperature for 30 minutes; then pyridine (19.6 cc.) is added and the solution is poured on ice-water. This mixture is extracted with ether and the ethereal solution is washed successively with water, sodium bicarbonate and water.

After drying the solvents and evaporating to dryness, the residue is taken in methanol and the resulting solid is filtered, yielding 6-chloro-3β,17β-diacetoxyandrosta-4,6-diene M.P. 159–161° C. Further crystallization from methanol yields the pure chloro-derivative M.P. 160–161° C. $[\alpha]_D$—73.7°. The ultra-violet spectrum shows maxima of absorption at 233.5 mμ, 243 mμ, and 251 mμ with extinction coefficients of 20400, 22900 and 15500.

Calcd. for $C_{23}H_{31}O_4Cl$: C%, 67.87; H%, 7.68; Cl%, 8.72. Found: C%, 68.01; H%, 7.68; Cl%, 8.86.

In the same manner, the 3β,17β-diacyloxyandrost-4-en-6-ones, obtained in the same manner as described in Example 9, yield the corresponding 6-chloro-3β,17β-diacyloxyandrosta-4,6-dienes which are hydrolyzed to 6-chloro-3β,17β-dihydroxyandrosta-4,6-diene which is oxidized in turn to 6-chloroandrosta-4,6-diene-3,17-dione.

*Example 11.—3β-acetoxy-6-chlorocholesta-4,6-diene*

A mixture of 3β-acetoxycholest-4-en-6-one [M. Heilborn, C. R. H. Jones, F. J. Spring, J. Chem. Soc. (1937) 801] (1.79 g.), phosphorus pentachloride (1.79 g.) and carbon tetrachloride (90 cc.) is stirred at room temperature for 90 minutes. At the end of that time, pyridine (9 cc.) is added and the solution is poured in ice-water. This mixture is extracted with ether and the organic solvents are washed with sodium bicarbonate and water to neutrality.

After drying and evaporating the solvents, the gummy residue is chromatographed on alumina. The pure 3β-acetoxy-6-chlorocholesta-4,6-diene is eluted with mixtures of benzene and hexane. The ultra-violet spectrum shows maxima of absorption at 236 mμ, 243 mμ, and 251 mμ with extinction coefficients of 18600, 21200, and 14100.

*Example 12.—6-chloro-3β-hydroxycholesta-4,6-diene*

A mixture of 3β-acetoxy-6-chlorocholesta-4,6-diene (1.1 g.), potassium bicarbonate (251 mg.), methanol (45 cc.) and water (4.5 cc.) is refluxed under nitrogen for 30 minutes. To the still hot solution, water is added and the resulting crystalline compound is filtered M.P. 181–185° C.

Further crystallization from methanol gives the pure 6-chloro-3β-hydroxycholesta-4,6-diene M.P. 179–181° C. The ultra-violet spectrum shows maxima absorption at 237 mμ, 244 mμ, and 253 mμ with extinction coefficients of 18200, 21300 and 14200.

In the same manner, the 3β-acyloxycholest-4-en-6-ones, obtained as in Example 11, yield the corresponding 3β-acyloxy-6-chlorocholesta-4,6-dienes, which are hydrolyzed to 6-chloro-3β-hydroxycholesta-4,6-diene which is in turn oxidized to 6-chlorocholesta-4,6-dien-3-one.

*Example 13.—17α-acetoxy-3β-hydroxypregn-4-ene-6,20-dione*

A mixture of 430 mg. 3β,17α-diacetoxypregn-4-ene-6,20-dione, described in the co-pending U.S. patent application Serial No. 285,210, 110 mg. potassium bicarbonate, 15 cc. of methanol and 1.5 cc. of water is refluxed under nitrogen for 30 minutes. Water is added and the mixture is extracted with ethyl acetate. The organic layer is washed with water to neutrality, dried and evaporated. The residue is crystallized from ether, M.P. 214.5–222° C.

Calcd. for $C_{23}H_{32}O_5$: C%, 71.11; H%, 8.30. Found: C%, 71.39; H%, 8.16.

*Example 14.—17α-acetoxy-3β-[3'-(cyclopentyl)]-propionyloxy-pregn-4-ene-6,20-dione*

A mixture of 9.0 g. of crude 17α-acetoxy-3β-hydroxypregn-4-ene-6,20-dione obtained as in Example 13, 90 cc. of pyridine and 9 cc. of cyclopentylpropionyl chloride is left at room temperature overnight. The mixture is poured into ice-water and extracted in ether. The ether is washed with dilute sulfuric acid, water, sodium bicarbonate and water. After drying and evaporating the ether, the residue is a tan foam. Pure 17α-acetoxy-3β[3'-(cyclopentyl)]-propionyloxypregn-4-ene-6,20-dione is obtained by chromatography on alumina and by crystallization from methanol, M.P. 163–167° C.

Calcd. for $C_{31}H_{44}O_6$: C%, 72.63; H%, 8.65. Found: C%, 72.70; H%, 8.48.

*Example 15.—17α-acetoxy-3β-hexanoyloxypregn-4-ene-6,20-dione*

A mixture of 9.4 g. of crude 17α-acetoxy-3β-hydroxypregn-4-ene-6,20-dione obtained as above, 94 cc. of pyridine and 9.4 cc. of hexanoic anhydride is left at room temperature for 36 hours. The product is worked up as above. The residue is chromatographed on alumina and crystallized from methylene chloride-hexane, M.P. 159–160° C.

Calcd. for $C_{29}H_{24}O_6$: C%, 71.58; H%, 8.70. Found: C%, 71.45; H%, 8.82.

In the same manner, other carboxylic acid esters of 17α-acetoxy-3β-hydroxypregn-4-ene-6,20-dione are prepared by reacting the appropriate acid anhydride or acid chloride in pyridine with the starting material. In this manner there are obtained 17α-acetoxy-3β-propionyloxypregn-4-ene-6,20-dione,
17α-acetoxy-3β-butyryloxypregn-4-ene-6,20-dione,
17α-acetoxy-3β-valeryloxypregn-4-ene-6,20-dione,
17α-acetoxy-3β-heptanoyloxypregn-4-ene-6,20-dione,
17α-acetoxy-3β-octanoyloxypregn-4-ene-6,20-dione,
17α-acetoxy-3β-benzoyloxypregn-4-ene-6,20-dione, and
17α-acetoxy-3β-phenylacetoxypregn-4-ene-6,20-dione.

*Example 16.—17α-acetoxy-6-chloro-3β-hexanoyloxypregna-4,6-dien-20-one*

To a solution of 5.05 g. of 17α-acetoxy-3β-hexanoyloxypregn-4-ene-6,20-dione, obtained as in Example 15, 5.05 g. of phosphorus pentachloride is added. After stirring for 30 minutes at room temperature, 10 cc. of pyridine are added. The product is worked up as described above. The residue is chromatographed on alumina to yield, after crystallization from methanol 17α-acetoxy-6-chloro-3β-hexanoyloxypregna-4,6-dien-20-one.

Calcd. for $C_{29}H_{41}O_5Cl$: C%, 68.95; H%, 8.32; Cl%, 7.03. Found: C%, 68.95; H%, 8.18; Cl%, 7.00, 6.93.

*Example 17.—17α-acetoxy-6-chloro-3β-[3'-(cyclopentyl)]-propionyloxypregna-4,6-dien-20-one*

A mixture of 6.1 g. of $PCl_5$ and a solution of 6.1 g. of 17-acetoxy-3β-[3'-(cyclopentyl)]-propionyloxypregn-4-ene-6,20-dione, obtained as in Example 14, in 300 cc. of $CCl_4$ is stirred for 30 minutes at room temperature. The reaction mixture is worked up as described above. The residue is a foam which is chromatographed on alumina. Fractions eluted with mixtures of benzene-hexane and pure benzene are combined and crystallized from methanol to yield 17α - acetoxy-6-chloro-3β-[3'-(cyclopentyl)]-propionyloxypregna-4,6-dien-20-one, M.P. 109–112° C.

Calcd. for $C_{31}H_{43}O_5Cl$: C%, 70.10; H%, 8.11; Cl%, 6.68. Found: C%, 69.85; H%, 8.21; Cl%, 6,69, 6.57.

In the same manner by reacting 17a-acetoxy-3β-acyloxypregn-4-ene-6,20-diones with $PCl_5$ under conditions as above, 17α - acetoxy-3β-acyloxy-6-chloropregna-4,6-dien-20-ones, are obtained, in which the acyloxy group is propionyloxy, buturyloxy, valeryloxy, heptanoyloxy, octanoyloxy, benzoyloxy and phenylacetoxy, respectively. Other 17-carboxylic acid esters of 3β-acetoxy-17α-hydroxypregn-4-ene-6,20-diones such as the 17α-propionate, butyrate, valerate and hexanoate and other 3β,17α-diacyloxypregn-4-ene-6,20-diones such as the 3β,17α-dipropionyloxy, 3β,17α-dibutyryloxy, 3β,17α-divaleryloxy, and 3β,17α-dihexanoyloxypregn-4-ene-6,20-diones are transformed by $PCl_5$ to the corresponding 3β - acetoxy-17α-acyloxy-6-chloropregna - 4,6 - dien-20-ones and 6-chloro-3β,17-diacyloxypregna-4,6-dien-20-ones. The appropriate 3β,17α-diacyloxy compound for these transformations are obtained by hydrolysis of the corresponding 3β-acetoxy-17α-acyloxy compounds and re-esterification with the appropriate acylating agents as described above.

Hydrolysis of the above compounds in the manner described in Example 3 yields the corresponding 17α-acyloxy - 6-chloro-3β-hydroxypregna-4,6-dien-20-ones, which are in turn oxidized to the corresponding 17α-acyloxy-6-chloro-6-dehydroprogesterones.

*Example 18.—3β-acetoxy-6-chloro-androsta-4,6-dien-17-one*

A mixture of 600 mg. of 3β-acetoxyandrost-4-ene-6,17-dione, prepared by dehydration with thionyl chloride in pyridine of the known 3β-acetoxy-5α-hydroxyandrostane-6,20-dione (L. Knof, Ann. 1962, 657, 174) as described in the co-pending U.S. patent application Serial No. 285,210, 600 mg. $PCl_5$ and 35 ml. of carbon tetrachloride is stirred for 30 minutes at room temperature. After the usual work-up, the residue is purified by chromatography or alumina to yield 3β-acetoxy-6-chloro-androsta-4,6-diene-17-one, M.P. 194–195.5°

I claim:
1. A process for preparing steroidal 6-chloro-4,6-dienes selected from the group consisting of pregnanes, androstanes and cholestanes, characterized by possessing the following structure in rings A and B

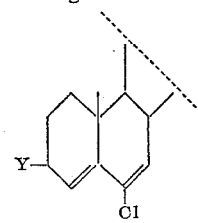

in which Y is selected from the group consisting of acyloxy, hydroxy and ketonic oxygen groups, comprising bringing into contact with each other a steroidal 3β-acyloxy-Δ⁴-6-ketosteriod selected from the group consisting of pregnanes, androstanes, and cholestanes, and characterized by possessing the following structure in rings A and B

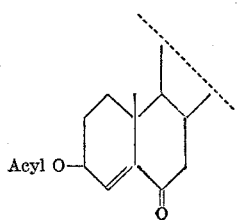

and phosphorus pentachloride in an inert, non-reactive solvent selected from the group consisting of carbon tetrachloride, ethyl acetate, and aromatic hydrocarbons with a boiling point below 150° C., to yield a steroidal 3β-acyloxy-6-chloro-4,6-diene selected from the group consisting of pregnanes, androstanes, and cholestanes, and characterized by possessing the following structure in rings A and B

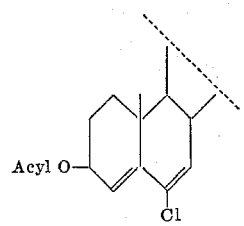

hydrolyzing said last-named compound in a basic medium to yield the corresponding steroidal 6-chloro-3β-hydroxy-4,6-diene selected from the group consisting of pregnanes, androstanes, and cholestanes, characterized by possessing the following structure in rings A and B

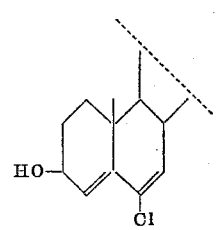

and oxidizing said last-named compound to obtain the corresponding steroidal 6-chloro-3-keto-4,6-diene selected from the group consisting of pregnanes, androstanes, and cholestanes, and characterized by possessing the following structure in rings A and B

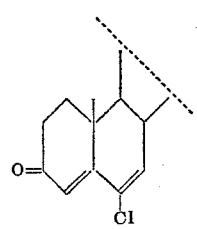

2. A process as defined in claim 1, in which Y represents an acyloxy group, comprising bringing into contact with each other a steroidal 3β-acyloxy-Δ⁴-6-ketosteroid selected from the group consisting of pregnanes, androstanes, and cholestanes, and characterized by possessing the following structure in rings A and B

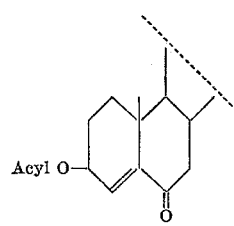

and phosphorus pentachloride in an inert, non-reactive solvent selected from the group consisting of carbon tetrachloride, ethyl acetate, and aromatic hydrocarbons with a boiling point below 150° C., to yield a steroidal 3β-acyloxy-6-chloro-4,6-diene selected from the group consisting of pregnanes, androstanes, and cholestanes, and possessing the following structure in rings A and B

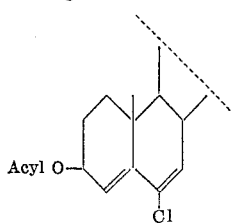

3. A process as defined in claim 1, in which Y represents the hydroxyl group, comprising bringing into contact with each other a steroidal 3β-acyloxy-Δ⁴-6-ketosteroid selected from the group consisting of pregnanes, androstanes, and cholestanes, and characterized by possessing the following structure in rings A and B

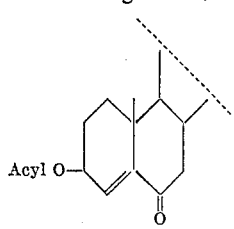

and phosphorus pentachloride in an inert, non-reactive solvent selected from the group consisting of carbon tetrachloride, ethyl acetate, and aromatic hydrocarbons with a boiling point below 150° C., to yield a steroidal 3β-acyloxy-6-chloro-4,6-diene selected from the group consisting of pregnanes, androstanes, and cholestanes, and possessing the following structure in rings A and B

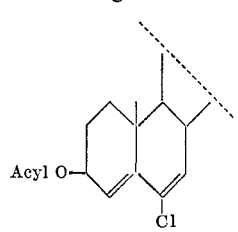

and hydrolyzing said last-named compound in a basic medium to yield the corresponding steroidal 6-chloro-3β-hydroxy-4,6-diene selected from the group consisting of pregnanes, androstanes, and cholestanes, and characterized by possessing the following structure in rings A and B

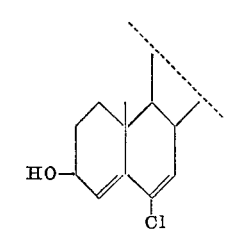

4. A process as defined in claim 1, in which Y represents the ketonic oxygen group, comprising bringing into contact with each other a steroidal 3β-acyloxy-Δ⁴-6-ketosteroid selected from the group consisting of pregnanes, androstanes, and cholestanes, and characterized by possessing the following structure in rings A and B

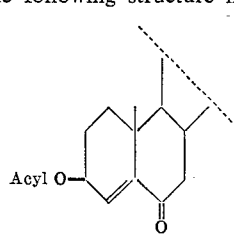

and phosphorus pentachloride in an inert, non-reactive solvent selected from the group consisting of carbon tetrachloride, ethyl acetate, and aromatic hydrocarbons with a boiling point below 150° C., to yield a steroidal 3β-acyloxy-6-chloro-4,6-diene selected from the group consisting of pregnanes, androstanes, and cholestanes, and possessing the following structure in rings A and B

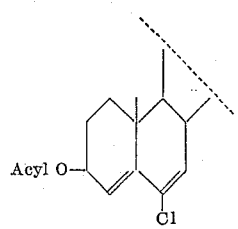

and hydrolyzing said last-named compound in a basic medium to yield the corresponding steroidal 6-chloro-3β-hydroxy-4,6-diene selected from the group consisting of pregnanes, androstanes, and cholestanes, and characterized by possessing the following structure in rings A and B

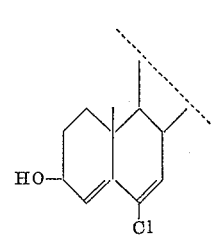

and oxidizing said last-named compound to obtain the corresponding steroidal 6-chloro-3-keto-4,6 - diene selected from the group consisting of pregnanes, androstanes, and cholestanes, and characterized by possessing the following structure in rings A and B

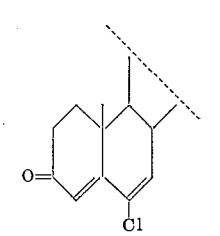

5. A process for the production of pregnane derivatives having the following structural Formula (i)

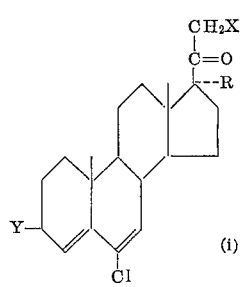

in which Y represents a substituent selected from the group consisting of acyloxy, hydroxy, and ketonic oxygen groups, in which R is a substituent selected from the group consisting of hydrogen, acyloxy, and straight-chain lower alkyl groups containing from 1 to 4 carbon atoms, and X represents a substituent selected from the group consisting of hydrogen and fluorine, comprising bringing into contact with each other a 3β-acyloxy-6-ketopregn-4-ene of the following structural Formula (ii)

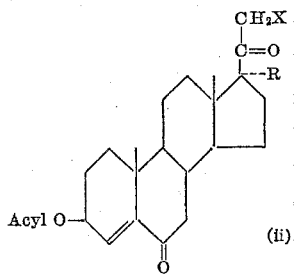

in which R and X have the significance defined above, and phosphorus pentachloride in an inert, non-reactive solvent selected from the group consisting of carbon tetrachloride, ethyl acetate and aromatic hydrocarbons with a boiling point below 150° C., to obtain a 3β-acyloxy-6-chloro-4,6-pregnadiene of Formula (i) in which Y represents an acyloxy group, and R and X have the significance defined above, hydrolyzing said last-named compound in a basic medium, to obtain the corresponding compound of Formula (i) in which Y represents the hydroxyl group, and R and X have the significance defined above, and oxidizing said last-named compound to obtain the corresponding 6-chloro-6-dehydroprogesterone of the general structure (i) in which Y represents the ketonic oxygen group, and R and X have the significance defined above.

References Cited by the Examiner

Djerassi-Steroid Reactions, pp. 138 and 146 (1963), Holden-Day, Inc., San Francisco, California.

LEWIS GOTTS, *Primary Examiner.*

HENRY A. FRENCH, *Assistant Examiner.*